US007375315B2

(12) United States Patent
Feldman et al.

(10) Patent No.: US 7,375,315 B2
(45) Date of Patent: May 20, 2008

(54) INTEGRATED OPTICAL TRANSCEIVER AND RELATED METHODS

(75) Inventors: Michael R. Feldman, Huntersville, NC (US); James E. Morris, Lake Wylie, NC (US)

(73) Assignee: Tessera North America, Inc., Charlotte, NC (US)

( * ) Notice: Subject to any disclaimer, the term of this patent is extended or adjusted under 35 U.S.C. 154(b) by 0 days.

(21) Appl. No.: 11/127,284

(22) Filed: May 12, 2005

(65) Prior Publication Data

US 2005/0205762 A1 Sep. 22, 2005

(51) Int. Cl.
*H01L 27/14* (2006.01)

(52) U.S. Cl. ....................... 250/239; 257/433; 257/434

(58) Field of Classification Search ..................... None
See application file for complete search history.

(56) References Cited

U.S. PATENT DOCUMENTS

| | | | | |
|---|---|---|---|---|
| 4,871,224 | A | 10/1989 | Karstensen et al. | 385/14 |
| 5,170,269 | A | 12/1992 | Lin et al. | 359/9 |
| 5,266,794 | A | 11/1993 | Olbright et al. | 250/214 LS |
| 5,274,250 | A * | 12/1993 | Miyake et al. | 257/59 |
| 5,500,540 | A | 3/1996 | Jewell et al. | 257/82 |
| 5,638,469 | A | 6/1997 | Feldman et al. | 385/14 |
| 5,729,038 | A * | 3/1998 | Young et al. | 257/460 |
| 5,764,832 | A | 6/1998 | Tabuchi | 385/49 |
| 5,771,218 | A | 6/1998 | Feldman et al. | 369/112.26 |
| 5,978,401 | A | 11/1999 | Morgan | 372/50 |
| 5,981,945 | A * | 11/1999 | Spaeth et al. | 250/239 |
| 6,243,508 | B1 | 6/2001 | Jewell et al. | 385/14 |
| 6,486,467 | B1 * | 11/2002 | Speckbacher et al. | 250/237 G |
| 6,566,745 | B1 * | 5/2003 | Beyne et al. | 257/680 |
| 6,758,595 | B2 * | 7/2004 | Seitz | 374/137 |

FOREIGN PATENT DOCUMENTS

| | | |
|---|---|---|
| EP | 0 729 143 | 8/1996 |
| WO | WO99/40578 | 8/1999 |

OTHER PUBLICATIONS

Hibbs-Brenner, et al. "Packaging of VCSEL Arrays for Cost-Effective Interconnects at <10 Meters" 1999 Electronic Components and Technology Conference, pp. 747-752 (Copyright 1999, IEEE).

* cited by examiner

*Primary Examiner*—Thanh X. Luu
*Assistant Examiner*—Stephen Yam
(74) *Attorney, Agent, or Firm*—Lee & Morse, P.C.

(57) ABSTRACT

An optical transceiver includes at least one light source and at least one detector mounted on the same surface of the same substrate. The detector is to receive light from other than a light source on the surface. At least one of the light source and the detector is mounted on the surface. An optics block having optical elements for each light source and detectors is attached via a vertical spacer to the substrate. Electrical interconnections for the light source and the detector are accessible from the same surface of the substrate with the optics block attached thereto. One of the light source and the detector may be monolithically integrated into the substrate.

12 Claims, 3 Drawing Sheets

222 224 220 230 210 200 206 208 202 204

122
124
120
130
100
110
106
108
102
104

222
224
220
230
210
200
206
208
202
204

INTEGRATED OPTICAL TRANSCEIVER AND RELATED METHODS

CROSS-REFERENCES TO RELATED APPLICATIONS

The present application claims priority under 35 U.S.C. §119 to PCT/US 01/07053 filed Mar. 6, 2001 and to Provisional Application Ser. No. 60/187,034 filed Mar. 6, 2000, and under 35 U.S.C. § 120 to co-pending U.S. patent application Ser. No. 10/231,483, the entire contents of all of which are hereby incorporated by reference their entirety for all purposes.

BACKGROUND OF THE INVENTION

Previous attempts at integrating a transceiver on a chip involved using monolithic integration, in which the active elements are formed in the substrate, and are thus all made of the same material. This does not allow optimum performance to be realized for at least one of the detector array and the light source array.

Other attempts have placed the active elements, e.g., the light sources and the detectors, on different substrates. However, this increases the complexity of the system due to an increased number of components and alignment difficulty.

SUMMARY OF THE INVENTION

The present invention is therefore directed to an integrated optical transceiver which substantially overcomes one or more of the problems due to the limitations and disadvantages of the related art.

The above and other objects of the present invention may be realized by providing an optical transceiver including at least one light source on a first surface of a substrate, at least one detector on the first surface of the substrate, at least one of the at least one light source and the at least one detector being mounted on the substrate, the at least one detector to receive light other than from a light source on the first surface of the substrate, and an optics block having optics for both the at least one light source and the at least one detector integrated thereon, the optics block being attached to the substrate.

The at least one light source and the at least one detector may be of different materials. One of the at least one light source and the at least one detector may be monolithically integrated with the substrate. The at least one light source may be an array of light sources and the at least one detector may be an array of detectors. The optical transceiver may include a spacer between the substrate and the optics block. The spacer may completely surround the periphery of the optics block. The spacer may include a plurality of separate spacers provided in the periphery of the optics block. The optics for the at least one light source and the at least one detector may have the same design. The optics for the at least one light source may be formed on an opposite side of the optics block from optics for the at least one detector. The optical may include interconnection features on the first surface of the substrate for the at least one light source and the at least one detector. The interconnection features may be on a same side or on opposite sides of the first surface of the substrate for both the at least one light source and the at least one detector. The optical array of light sources and the array of detectors may parallel or may form a line.

The above and other objects of the present invention may be realized by providing a method of forming an optical transceiver including providing a plurality of detectors on a first surface of a first wafer, providing a plurality of light sources on the first surface of the first wafer, at least one of the plurality of detectors and the plurality of light sources being mounted on the first wafer, the detectors to receive light from other than the plurality of light sources on the first surface, providing electrical interconnections for each of the plurality of detectors and each of the plurality of light sources on the first surface of the first wafer, providing an optics block having at least one optical element for each of the plurality of detectors and each of the plurality of light sources, providing a vertical spacer between the optics block and the first wafer; attaching the vertical spacer, the optics block and the first wafer to one another, and singulating the first wafer into a plurality of transceivers, each transceiver having at least one light source and at least one detector.

The method providing of the optics block may include forming the at least one optical element for each of the plurality of detectors and each of the plurality of light sources on a second wafer and attaching the second wafer to the first wafer before the singulating, with the singulating allowing access to the electrical interconnections. The providing of the vertical spacer may include forming vertical spacers for each of the transceivers on a spacer wafer and attaching the spacer wafer to the first wafer before the singulating, with the singulating allowing access to the electrical interconnections. The providing of the optics block may include forming the at least one optical element for each of the plurality of detectors and each of the plurality of light sources on a second wafer and attaching the second wafer to the spacer wafer and the first wafer before the singulating, with the singulating allowing access to the electrical interconnections. The attaching may include directly attaching the second wafer to the spacer wafer. The providing of one of the plurality of light sources and the plurality of detectors may include monolithically integrating into the first wafer. The providing electrical interconnections for each of the plurality of detectors and each of the plurality of light sources may include using the same mask for both interconnections to the detectors and the light sources.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, aspects and advantages will be described with reference to the drawings, in which.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known devices and methods are omitted so as not to obscure the description of the present invention with unnecessary details.

Rather than using monolithic integration, many of the advantages of integration can still be realized by providing the light source array and the detector array on the same surface of a single substrate and providing an optics block having the optical elements for both the light source array and the detector array integrated therein.

Figure 1:
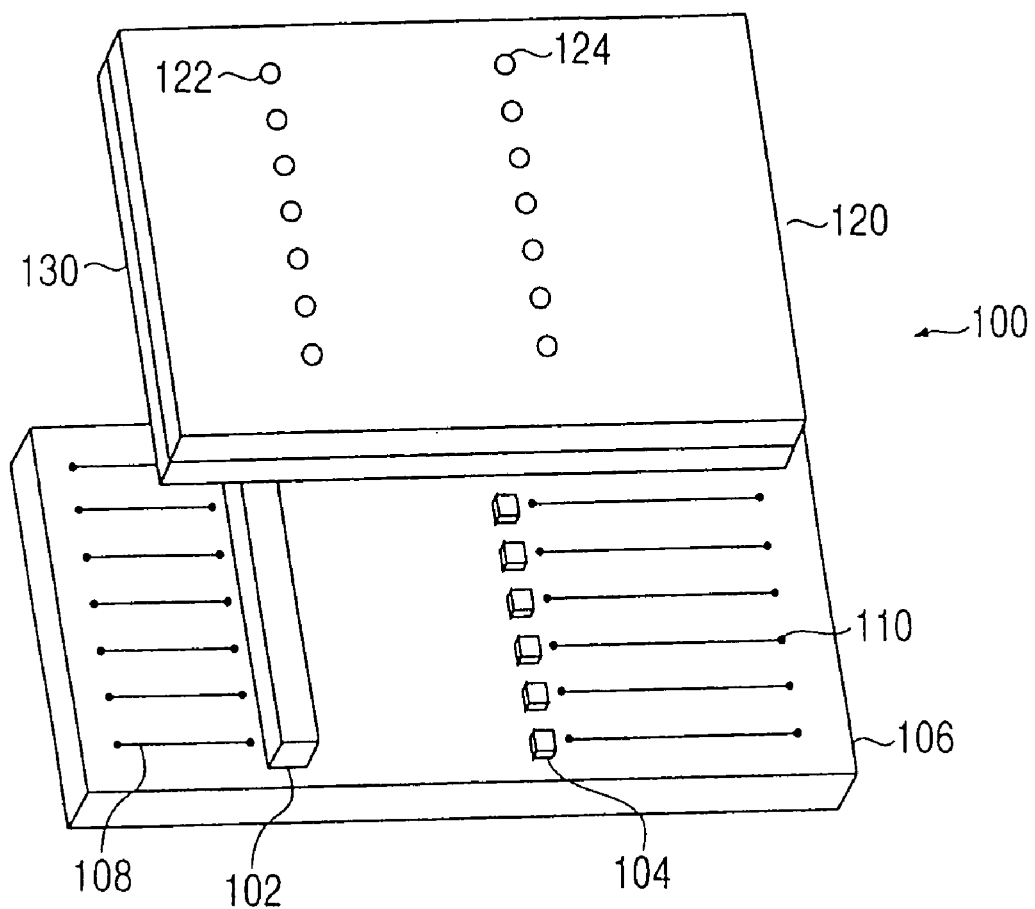
FIG. 1 is an elevational exploded top view of an optical transceiver of the present invention.
Figure 2:
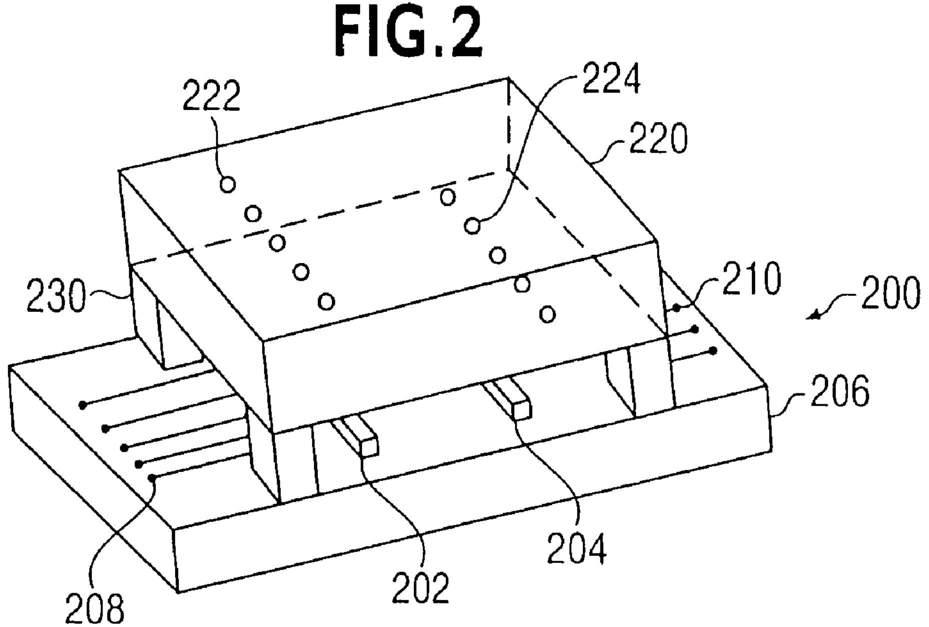
FIG. 2 is an elevational side view of another optical transceiver of the present invention.

Related, co-pending U.S. Provisional Application Ser. No. 09/690,763 entitled "Fiber Interfaces Including Parallel Arrays, Power Monitoring and/or Differential Mode Delay Compensation" filed on Oct. 18, 2000, describes a laser array and a detector array on the same substrate. In this previous application, the detector array was used for monitoring the power of the lasers, a portion of the output laser beams being directed to the detector. In accordance with the present disclosure, a light source array and a detector array are integrated on the same substrate, but, as shown in FIGS. 1 and 2 of the present application, these detectors are for receiving a signal from a remote location, not for monitoring the light source array. Of course, an additional array of monitor detectors could be provided for monitoring the output of the light sources.

In FIG. 1, an optical transceiver 100 includes a light source array 102, here shown as a vertical cavity side emitting laser (VCSEL) array, and a detector array 104 are integrated on a silicon wafer 106. Silicon interconnect tracks 108 supply power to the active elements 102, 106 and pads 110 allow the detector signals to be read out.

An optics block 120 contains two sets of integrated optics, one set 122 for the light source array 102 and one set 124 for the detector array 104. The integrated optics 122 for the light source receive light from the light source array 102 and direct the light to a desired application. The integrated optics 124 for the detectors receive light from a desired application and direct the light to the detector array 104. The optics may be diffractives, refractives or hybrids thereof and may be formed lithographically on the optics block 120.

The integrated optics 122, 124 for the light source array and the detector array may include optical elements formed on either or both surfaces of the optics block 120. Since the optics for both the light source array and the detector array are aligned simultaneously, the assembly and alignment steps required for creating a transceiver are reduced. Further, the integration allows the transceiver to be smaller and have fewer parts. Depending upon the material used for the substrate, either the detector array or the light source array may be monolithically integrated therein.

The transceiver 100 also includes a spacer 130 between the active elements and the optics block 120. The spacer may be an integrated spacer surrounding the perimeter of the optics block, as shown in FIG. 1. The spacer may be a separate element, formed in the optics block or formed in the substrate. The spacer may serve to protect the active elements.

In FIG. 2, the bonded structure of a transceiver 200 is shown. Rather than having a spacer 130 around the perimeter of the optics block 120, separate spacer elements 230 are positioned at the corners of the optics block. Also, the optics 222 for the light sources 202 are on a different surface of the optics block 220 than the optics 224 for the detectors 204. The optics for both the light sources and the detectors may have the same design. Again, light sources 202 and detectors 204 are on the same substrate 206, and one of them may be monolithically integrated therein. Silicon tracks 208 and pads 210 for providing power and signals to and from the active elements are also on the substrate.

Figure 3:
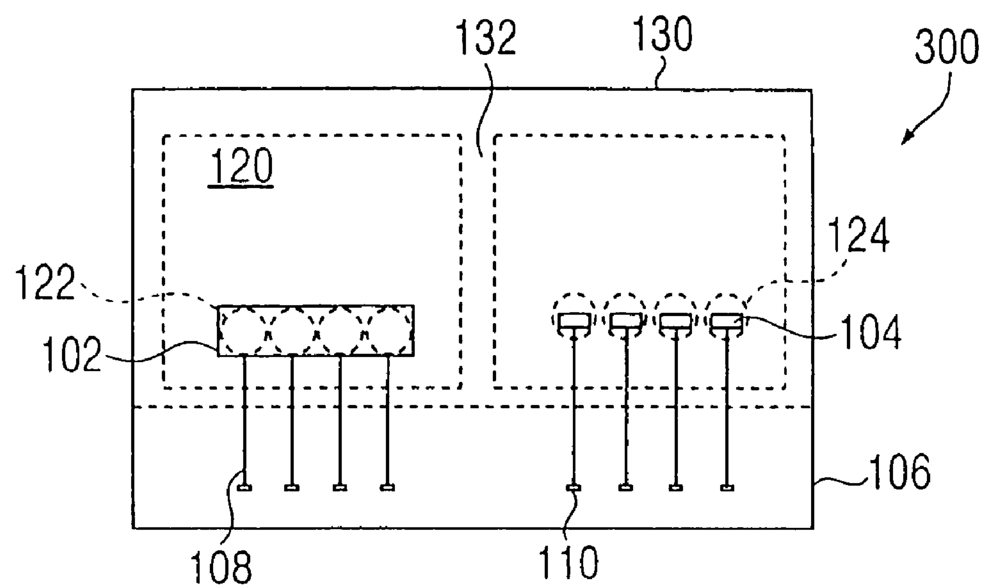
FIG. 3 is a top view of another configuration of the light sources and detectors on the same substrate.

FIG. 3 is a top view of a transceiver 300 in accordance with another embodiment of the present invention. In FIG. 3, rather than having the active elements 102, 104 arranged in parallel arrays, the active elements form a linear array. In the particular example shown in FIG. 3, four light sources 102 and four detectors 104 are in a line. The spacing therebetween reduces cross-talk between the active devices. Corresponding optical elements 122,124 are also now in a single line. This configuration allows a standard 1×12 fiber array to be connected with the transceiver. This configuration also allows all the required interconnection to be provided on a same side of the substrate 106, thereby allowing the optics block 120 and the substrate 106 to share a common edge, which may facilitate manufacturing at the wafer level.

In any of the configurations, the components may be attached using wafer-to-wafer bonding techniques, as set forth, for example, in U.S. Pat. Nos. 6,096,155 and 6,104,690,commonly assigned, which are hereby incorporated by reference in their entirety for all purposes. Both of the above configurations allow the optics for both the transmitter portion and the receiver portion to be aligned simultaneously. As used herein, the term wafer is meant to generally refer to any structure having more than one component which is to be singulated, e.g., diced, for final use. The resultant wafer having a plurality of the transceivers thereon is then singulated, i.e., vertically separated, to form a plurality of transceivers.

Figure 4:
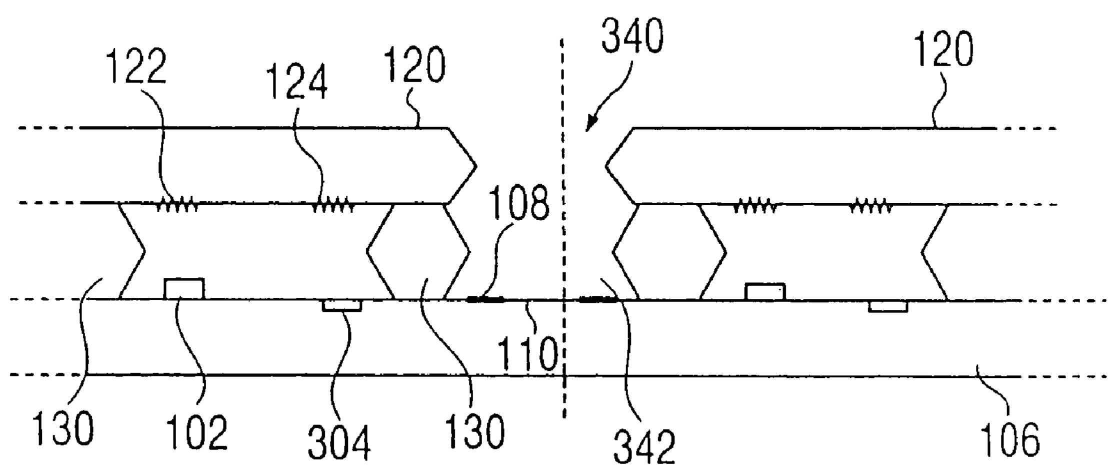
FIG. 4 is a schematic side view of the creation of multiple transceivers in accordance with the present invention.

A particular example of wafer bonding all three substrates together before separating is shown in FIG. 4. By creating spaces 340 between the sets of optical elements 122, 124 for each transceiver and spaces 342 between the spacers 130 for each transceiver, e.g., by etching in silicon as shown, the individual transceivers may be realized by separating the substrate 106 containing the light sources 102 and detectors 304 at the appropriate points. As shown in FIG. 4, the detectors 304 are monolithically integrated into the substrate 106. Whichever active element to be provided on the substrate has the higher effective yield is preferably the monolithically integrated element, since the monolithically integrated elements will not be able to be substituted out. Further, the metalization required for the electrical connections for both the monolithically integrated element and the additional active element on the substrate are formed using the same mask set as that for forming the monolithically integrated element. This helps insure precise alignment, since the active element to be mounted can use its metalization to provide its alignment, e.g., by solder self-alignment. The active elements that are to be mounted on the substrate may then be tested before being mounted. After mounting, they may be tested again and replaced if required before the wafer bonding. As used herein, bonding may include any type of attachment, including the use of bonding materials, surface tension or directly forming on the same substrate. As used herein, separating or singulating may include any means for realizing individual components, e.g., dicing.

Figure 5:
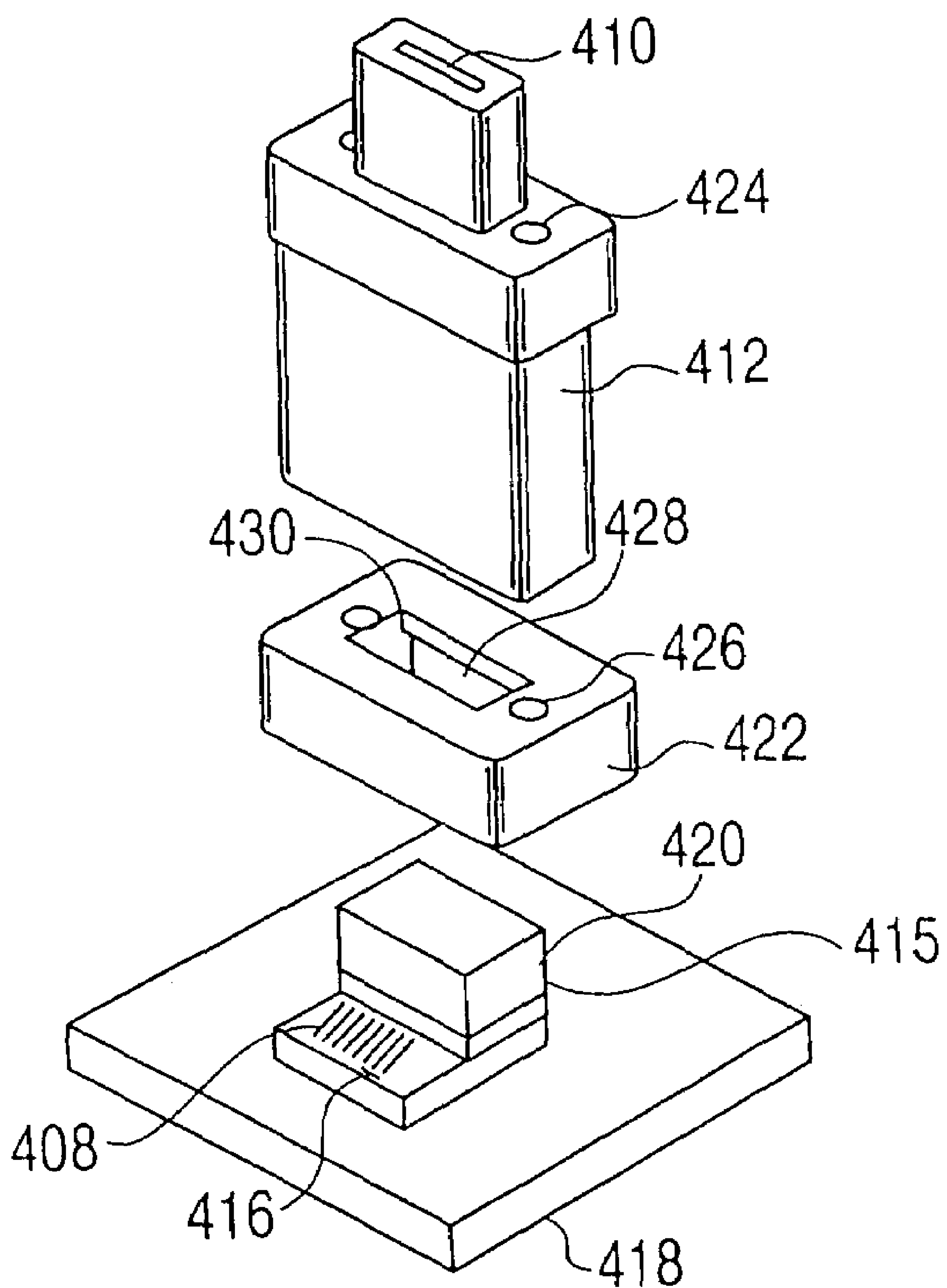
FIG. 5 is an exploded elevational perspective view of an interface in conjunction with fibers in a housing and the transceiver of the present invention.

The alignment of the active elements to the input and output ports corresponding thereto, typically fibers, is particularly important. One configuration for insuring proper alignment between the transceiver and fibers is shown in FIG. 5. As can be seen in FIG. 5, a plurality of fibers 410 are inserted into a ferrule 412. The active elements of the present invention, here the linear configuration as shown in FIG. 3, which are to be in communication with the fibers 410, are preferably provided on a silicon bench or sub-mount 416, corresponding to the common substrate 106 in FIG. 3. In turn, this silicon bench 416 is preferably provided on a substrate 418. An optics block 420 provides at least one optical element between each opto-electronic device on the sub-mount 416 and a corresponding fiber 410. The optics block 420 is preferably spaced from the opto-electronic devices by a spacer 415. The optical elements preferably include elements which collimate, focus, homogenize or otherwise couple the light. Since the optics block has two surfaces, two optical elements may be provided thereon. Further, if required, additional optics blocks may be bonded to and spaced from the optics block 420 to provide additional surfaces, as with any of the previous transceiver configurations.

The spacer 415 is then bonded, e.g., using solder or epoxy, into place on the bench 416. The bevels which can be seen on the interior surface of the spacer 415 simply arise when using silicon as the spacer and the hole therein is formed by wet etching silicon along its crystalline plane. While wet-etching is a simple way of forming the hole in the spacer, vertical side walls may be more advantageous, e.g., for load bearing. Substantially vertical side walls may be realized by dry etching silicon. Further, other materials such as ceramic, glass, plastic, may be used for the spacer 415. If the spacer 415 is transparent to wavelengths of interest, the hole therein may not be required.

Preferably, the alignment and bonding of the spacer 415 and the optics block 420 occur on a wafer level, and then diced to form respective dies which are then aligned to the bench 416. The alignment of the spacer 415 is not very sensitive, i.e., the spacer just needs to be aligned so that it does not block light between the optics block 420 and the opto-electronic device. While a spacer 415 may be formed directly on the optics block 420 itself, the use of a separate spacer 15 allows larger vertical separation to be achieved. The use of a separate spacer is particularly advantageous when providing optical elements on a bottom surface of the optics block 20, since the processes for forming the optics and the spacer features interfere with each other. Finally, use of a separate spacer allows the sealing off of the opto-electronic device to be more readily and stably achieved. Such sealing protects the opto-electronic device from environmental factors, such as humidity.

A mechanical interface 422 aligns the optics block 420, which is already aligned with the electro-optical devices, with the fibers 410. This may be achieved by the provision of alignment features on both the mechanical interface 422 and the ferrule 412 housing the fibers 410. In the particular example shown, these alignment features consist of holes 424 in the ferrule 412, which are already typically present for aligning the ferrule with other devices, and alignment holes 426 in the mechanical interface 422. Once these alignment holes 424, 426 are aligned, an alignment pin, not shown, may then be inserted therein to maintain the aligned position. Further details of such interfaces may be found, for example, in commonly assigned, co-pending application U.S. Ser. No. 09/418,022, now U.S. Pat. No. 6,374,004, entitled "Optical Subassembly" which is incorporated by reference in its entirety for all purposes.

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation. Thus, the scope of the invention should be determined by the appended claims and their legal equivalents, rather than by the examples given.

What is claimed is:

1. An optoelectronic package, comprising:

an optoelectronic device;

a mount supporting the optoelectronic device;

a transparent cover having at least one optical element formed thereon for relaying light between the optoelectronic device and another device; and a spacer between the optoelectronic device and the transparent cover, the spacer being separate from the mount and the transparent cover, the spacer providing a passage therethrough between the transparent cover and the optoelectronic device, the spacer and the transparent cover sealing the optoelectronic device from environmental factors, wherein the at least one optical element is a lithograph, and the lithograph is a diffractive optical element.

2. The optoelectronic package as claimed in claim 1, wherein the passage in the spacer has beveled sidewalls.

3. The optoelectronic package as claimed in claim 2, wherein the beveled sidewalls have a crystalline etch angle of a material used for the spacer.

4. The optoelectronic package as claimed in claim 3, wherein the material is silicon.

5. A method of forming an optoelectronic package, comprising:

providing an optoelectronic device on a mount;

aligning a spacer to the mount;

etching the spacer to expose the optoelectronic device, the spacer leaving the optoelectronic device exposed when aligned to the mount;

lithographically forming an optical element on a transparent cover; and aligning the transparent cover to the spacer and the optoelectronic device, the spacer and the transparent cover sealing the optoelectronic device from environmental factors.

6. The method as claimed in claim 5, wherein the etching occurs before the aligning.

7. The method as claimed in claim 5, further comprising:

attaching at least two of the spacer, the cover and the mount at a wafer level to form a vertical stack; and singulating the vertical stack to form the optoelectronic package.

8. The method as claimed in claim 5, wherein the etching includes etching from both a front and a back of the spacer.

9. A method of forming an optoelectronic package, comprising:

providing an optoelectronic device on a mount;

etching a wafer to form a plurality of spacers;

aligning a spacer to the mount, the spacer leaving the optoelectronic device exposed when aligned to the mount;

lithographically forming an optical element on a transparent cover;

aligning the transparent cover to the spacer and the optoelectronic device, the spacer and the transparent cover sealing the optoelectronic device from environmental factors;

attaching at least two of the spacer, the cover and the mount at a wafer level to form a vertical stack; and singulating the vertical stack to form the optoelectronic package.

10. The method as claimed in claim 9, wherein the etching is dry etching.

11. The method as claimed in claim 9, wherein the etching is wet etching.

12. An optoelectronic package, comprising:

an optoelectronic device;

a mount supporting the optoelectronic device;

a transparent cover; and a spacer between the optoelectronic device and the transparent cover, the spacer being separate from the mount and the transparent cover, the spacer providing a passage therethrough between the transparent cover and the optoelectronic device, the spacer and the transparent cover sealing the optoelectronic device from environmental factors, the passage in the spacer having beveled sidewalls, wherein an angle of the beveled sidewall from a top surface of the spacer is equal to an angle of the beveled sidewall from a bottom surface of the spacer.

* * * * *